United States Patent [19]
Stroll, Jr.

[11] Patent Number: 5,095,385
[45] Date of Patent: Mar. 10, 1992

[54] GLARE GUARD FOR COMPUTER TERMINAL

[76] Inventor: John J. Stroll, Jr., 980 Post Rd. East, Westport, Conn. 06880

[21] Appl. No.: 489,352

[22] Filed: Jul. 13, 1990

[51] Int. Cl.⁵ .............................. G02B 27/00
[52] U.S. Cl. ................................. 359/609
[58] Field of Search ............ 350/276 R; 358/255, 358/258

[56] References Cited

U.S. PATENT DOCUMENTS

| | | | |
|---|---|---|---|
| 2,482,031 | 9/1949 | Rose | 350/276 R |
| 3,564,138 | 2/1971 | Harrold | 358/255 |
| 4,569,572 | 2/1986 | Kopich | 350/276 R |
| 4,784,468 | 11/1987 | Tierney | 350/276 R |
| 4,863,242 | 9/1989 | Correa | 350/276 R |
| 4,880,300 | 11/1989 | Payner et al. | 350/276 R |

Primary Examiner—Scott J. Sugarman
Assistant Examiner—Rebecca D. Gass
Attorney, Agent, or Firm—Morgan & Finnegan

[57] ABSTRACT

A glare reduction system for video display screens having a top, a bottom and two side projection panels wherein each panel projects outwardly from an edge of the video display screen. There is also included at least one shutter panel which is mounted at or near an outward edge of at least one of the projection panels and which is adjustable to control reflective light.

11 Claims, 1 Drawing Sheet

GLARE GUARD FOR COMPUTER TERMINAL

BACKGROUND OF THE INVENTION

1. Field Of The Invention

This invention concerns devices and systems for improving the viewing of video display screens, such as computer terminal display monitors or television screens, by reducing and/or preventing glare.

2. Description Of The Prior Art

It has already been recognized that glare resulting from sunlight can present significant difficulties in viewing and operating display screens such as computer terminal display screens. The problem of reducing glare in the use of computer display terminals has been addressed by a widely varying assortment of devices, from a relatively simple visor assembly such as is disclosed in U.S. Pat. No. 4,863,242 issued to Correa on a somewhat complex reflecting system, such as those disclosed in U.S. Pat. No. 4,880,300 issued to Payner et al.

Shields or hoods are disclosed for this purpose in U.S. Pat. No. 4,569,572 issued to Kopich. A rigid shield assembly for reducing glare, which can be adjusted with respect to its position, is disclosed in U.S. Pat. No. 4,784,468 issued to Tierney. Such devices allow the shield to be moved depending upon the angle of light. Hinged swinging panels have also been used as a light shield for cathode ray tube displays, such as those disclosed in U.S. cathode ray tube displays, such as those disclosed in U.S. Pat. No. 3,564,138 issued to Harrold.

Nevertheless, glare remains a serious problem for those who spend large amounts of time viewing display screens such as computer display terminals. Glare can impede accurate vision and it can also cause eyestrain, discomfort and fatigue. While prior attempts to reduce glare in the viewing of display terminals has helped solve some of the difficulties associated with glare in certain environments and applications, there still exists a need for a simple and effective system for substantially reducing and/or preventing glare in the viewing of display terminals which has wide application. A particular need remains for a system to reduce or eliminate glare caused by reflection below the screen.

It is an object of the present invention to not only reduce and/or prevent glare from overhead light but to reduce glare from all angles.

It is a further object of the present invention to increase the security of a video display by limiting visual access to the video screen.

It is a still further object of the present invention to provide panels which form a part of the glare reducing and/or preventing device, and which can be used to mount various objects.

SUMMARY OF THE INVENTION

The present invention is a glare reduction and/or prevention system for video display monitors, such as computer terminal displays. The system generally comprises four panels, a top, bottom and two side panels, which project from each of the four sides of the video display monitor (projection panels). The panels reduce the amount of light falling onto the screen from any direction. Shutter panels can also be attached to at least one of the panels and can be selectively positioned to control reflective light.

The projection panels may fold inwardly so that they are collapsible. A further embodiment includes optional bulletin board panels which can be attached to the side and to the top projection panels.

In a preferred embodiment, the glare guard of the present invention has 9 panels that can be fitted over or attached to a video display such as a computer terminal, personal computer, or laptop computer. One panel attaches to or fits over the top of the terminal and projects straight out toward the computer operator. It blocks light from above and looks just like a canopy. A second panel attaches to or fits under the bottom of the terminal and projects straight out toward the computer operator and acts like a shelf at the bottom of the terminal. It blocks light that is reflected off the top of the desk. The third and fourth panels are attached to or fits over the left and right sides of the terminal. They prevent light from falling onto the screen from each side. These four panels project outwardly and form an enclosure around the terminal so that light can not fall onto the screen. A fifth and sixth panel attach to the enclosure portion and form adjustable shutters that let the operator peek in at the video display. The opening to the video display can be adjusted according to how much of the screen one wishes to have visible. The seventh, eighth and ninth panels form small walls that act like a bulletin board. They can be opened towards the operator or can be removed and may be tiltable. The seventh and eighth panels can be attached to the left and right side of the terminal just like ears attach to a face. The ninth panel can be attached perpendicular to the top projection panel. The bottom edge of the seventh and eighth panels may have a shelf which can be curved. The shelf can be made any desirable size and, e.g., can be 2" wide and 10" long so that pens and pencils and other objects can be stored thereon.

All panels of the present glare guard can be made to be adjustable in length, height, or width so that they can fit around or attach to any size terminal. This is especially important for the enclosure portion. Even the bulletin portion panels can be pre-cut so that one can break off small sections of each panel until the ideal size to fit the terminal is obtained.

The enclosure portion panels can be made to fold inward or are collapsible to facilitate for their use with laptop computers. This will permit the operator to close the laptop computer's cover even with the present glare guard system still attached.

The features and advantages of the invention will become more apparent from the following description when taken in connection with the accompanying drawings which show, for purposes of illustration only, four embodiments in accordance with the present invention.

It should be understood by those skilled in the art of glare prevention for video terminals that other forms of the present invention may be had, all coming within the spirit of the invention and scope of the appended claims.

DETAILED DESCRIPTION OF THE PREFERRED EMBODIMENT

Figure 1:
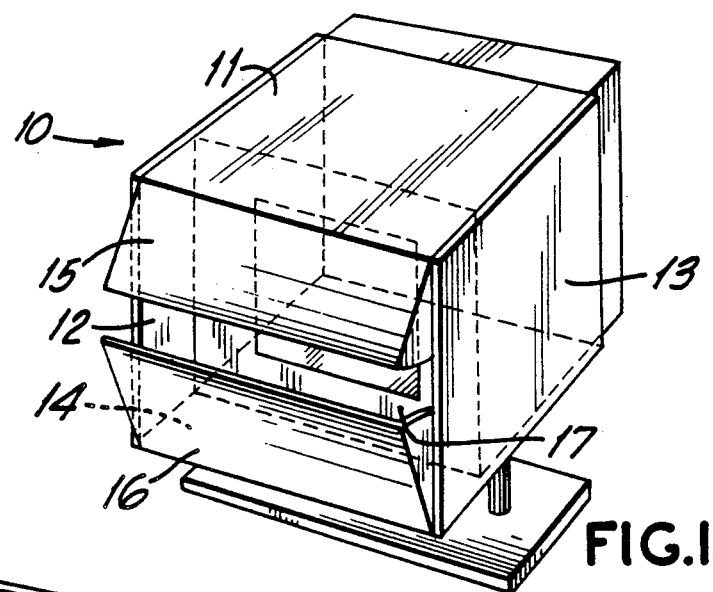
FIG. 1 is a prospective view of the glare guard assembly of the present invention.

The present invention is generally indicated in FIG. 1 as 10 and comprises an enclosure system of adjustable side projection panels, 12, 13, top projection panel 11, bottom projection panel 14, and, additionally, adjustable shutter panels 15, 16.

Each of the projection panels, 11, 12, 13, 14, extends outward, toward the viewer, from one side of the display 17. Each of the projection panels fits over or attaches to the display by conventional means. Thus, the projecting panels form a cave or enclosure which circumscribes the video display screen. The cave or enclosure encompasses the entire video display and prevents reflective light from entering or leaving the video display from all sides and directions.

Shutter panels 15 and 16 can be connected at or near the distal ends of the enclosure comprised of panels 11, 12, 13, and 14. The shutter panels 15, 16 are adjustable so as to selectively cover the entire screen, or to allow viewing of selected portions of the screen.

The glare reduction system of the present invention which includes shutter panels 15, 16 further reduces glare not just from overhead light but from all sides. Even light that is reflected from below the display terminal, e.g., from a desk, may be blocked as well as light reflected off the video display screen viewer's apparel. Moreover, the shutter panels, 15, 16, provide the additional benefit of confidentiality. The shutters can also be utilized to prevent anyone but the viewer from seeing information appearing on the computer terminal display.

The shutter panels, 15, 16 are preferably made of various materials including rigid plastic and each panel can be adjustable for different size terminals, tiltable and removable.

The projection panels, 11, 12, 13, 14 can also be preferably made of rigid plastic and each panel can be adjustable for different size terminals or can be collapsible.

Figure 2:
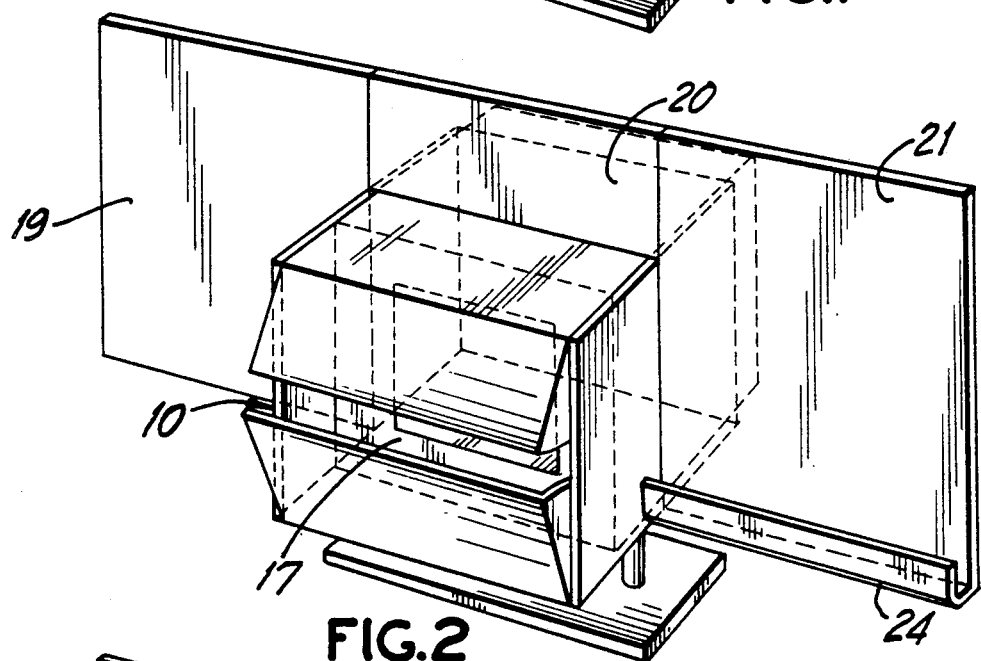
FIG. 2 is a prospective view of the present glare guard assembly including optional panels that can be used as computer terminal bulletin boards.

FIG. 2 illustrates an optional embodiment of the glare-reducing system of the present invention in which additional bulletin board panels, 19, 20 and 21 are provided. The bulletin board panels, 19 and 21 are (hingeably) connected to side projection panels, 12, 13 and are movable so that they can be opened so as to form walls on either side of the display terminal that can function as bulletin boards and to also block light. Bulletin board panel 20 is connected to top projection panel 11 and can be opened upwardly to form another bulletin board or wall.

Preferably, all panels of the system are adjustable in length, height, and width so that they can fit around or attach to any size terminal.

Figure 3:
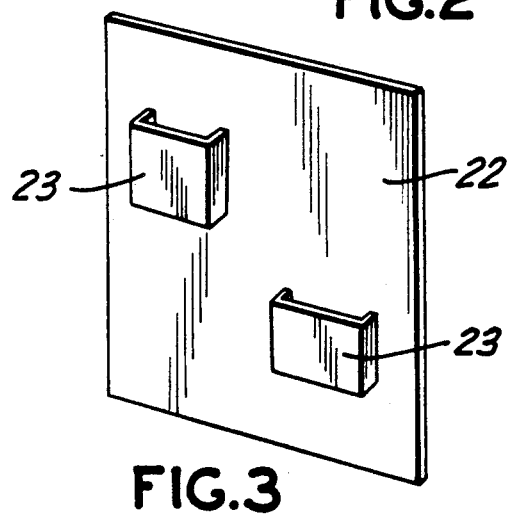
FIG. 3 is an illustration of an optional bulletin board assembly.

FIG. 3 shows an optional embodiment of one of optional area 23 shown as pockets, for holding objects. Various shapes and forms of pockets are possible including clear pockets. Instead of pockets, other means for holding and/or viewing objects, such as frames may be employed.

Adjustable shutters on the top and bottom are able to adjust the viewing opening to the video display screen and allow viewing as much of the screen as desired. The bulletin board panels can be as wide as desired and can have compartments such as picture frames into which papers or memos or other objects can be inserted and can be readily seen and/or read therethrough. The compartments on the bulletin board panels can also be in the form of pockets into which small objects such as memos, a pocket calculator, an eraser or a ruler can be placed and removed when desired. The bulletin board panels 19, 21 can be attached anywhere along the side projection panels 12, 13 and panel 20 may be attached at any desired point along top panel 11.

Figure 4:
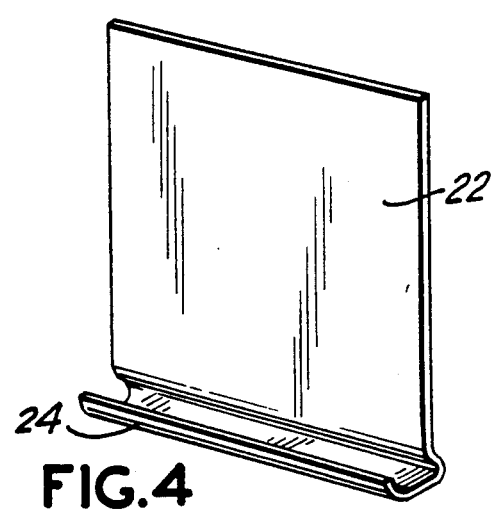
FIG. 4 is another optional bulletin board assembly.

Additionally, the left or right bulletin panels can be made with a small extension 24 as seen in FIGS. 2 and 4 at the bottom which can act as a shelf for holding various articles, such as pencils and pens or documents which are being inputted to the computer. The shelf can also be curved so that articles on the shelf will not roll off if the video terminal is tilted when the operator adjusts the terminal.

The glare guard of the present invention reduces and/or prevents glare not just from overhead light but light from all angles. Additionally, light reflected from the body of the operator can be prevented from reading the video screen. This glare reduction and/or prevention reduces eye fatigue and, ultimately, absenteeism due to headaches that are the result of glare. The glare guard of the present invention also increases the security of a computer video display terminal. By adjusting the shutter panels, one can prevent others from viewing the screen and, hence, prevent others from seeing, inter alia, a secret password or other confidential data.

The bulletin board panels can be tiltable, detachable and/or foldable. Notes and memos can be attached neatly to the bulletin board panels. Instead of having a messy computer room or terminal that has memos and flyers pinned or taped all over, the bulletin panels allows for better organization. Notes can be attached to the bulletin board portion of the present invention and, if the notes are confidential, then the bulletin board section can be detached, folded, and locked away. No longer does one need to remove each note. Additionally, the bulletin boards serve to block light.

The glare guard of the present invention which has a curved shelf where pens and pencils can be stored offers the benefit of finding a pen or pencil easily. When the optional bulletin board panels have many small picture frames attached in which memos can be slid into and easily viewed, time is no longer wasted searching through piles of memos. The bulletin board panels can also include a movable bar which can be used by the video display user to follow line by line any data which is being read or inputted.

The glare guard of the present invention can be constructed from various materials including plastic or cardboard and the various panels can be painted black to further help in reducing and/or preventing glare.

I claim:

1. A glare reduction system for video display screens comprising a top, a bottom and two side projection panels wherein each panel projects outwardly from an edge of the video display screen and at least one shutter panel, said shutter panel being mounted at or near an outward edge of at least one of the projection panels and being adjustable to control reflective light.

2. The glare reduction system of claim 1 having shutter panels mounted along the top and bottom projection panels.

3. The glare reduction system of claim 1 further comprising at least one bulletin board panel affixed to the side or top projection panel.

4. A glare reduction assembly for video display screens comprising an enclosure portion for the screen comprised of a top panel, left and right depending side panels and a bottom panel, said enclosure portion being adapted to fit over or attach to a unit having a video display screen and projects outwardly from an edge of the video display screen and at least one shutter panel attached at or near an outer edge of at least one of the panels and being adjustable to control reflective light.

5. A glare reduction assembly according to claim 4, further comprising a side moveable panel attached to the left or right side panel which is adapted to be opened at an angle from the side panel.

6. A glare reduction assembly according to claim 5, further comprising shelf means along a bottom edge of the side moveable panel for placing or storing items.

7. A glare reduction assembly according to claim 5, wherein the side moveable panel has means attached thereto for placing and holding objects.

8. A glare reduction assembly according to claim 5, where the side moveable panel has a moveable bar to facilitate the reading of data.

9. A glare reduction assembly according to claim 4, further comprising a top moveable panel attached to the top panel and adapted to be opened at an angle from the top panel.

10. A glare reduction assembly according to claim 4 having a shutter panel along both the top and bottom panels.

11. A glare reduction assembly according to claim 10, further comprising a side moveable panel attached to the left or right side panel which is adapted to be opened at an angle from the side panel and a top moveable panel attached to the top panel and adapted to be opened at an angle from the top panel.

* * * * *